United States Patent [19]

Tada

[11] Patent Number: 5,377,083
[45] Date of Patent: Dec. 27, 1994

[54] SURFACE ILLUMINATOR

[75] Inventor: Masahiko Tada, Hyogo, Japan

[73] Assignee: Mitsubishi Denki Kabushiki Kaisha, Tokyo, Japan

[21] Appl. No.: 77,061

[22] Filed: Jun. 16, 1993

[30] Foreign Application Priority Data

Oct. 16, 1992 [JP] Japan .................................. 4-303296

[51] Int. Cl.$^5$ .............................................. F21V 8/00
[52] U.S. Cl. ..................... 362/31; 362/326; 362/327
[58] Field of Search ................ 362/31, 26, 327, 326

[56] References Cited

U.S. PATENT DOCUMENTS

| | | | |
|---|---|---|---|
| 4,933,814 | 6/1990 | Sanai | 362/31 |
| 4,975,808 | 12/1990 | Bond et al. | 362/31 |
| 5,029,045 | 7/1991 | Sanai et al. | 362/31 |
| 5,050,046 | 9/1991 | Tada | 362/31 |
| 5,101,325 | 3/1992 | Davenport et al. | 362/31 |
| 5,136,483 | 8/1992 | Schöniger et al. | 362/31 |
| 5,150,960 | 9/1992 | Redick | 362/31 |

FOREIGN PATENT DOCUMENTS 62-69281  4/1987  Japan .

Primary Examiner—Richard R. Cole

[57] ABSTRACT

A surface illuminator provided with a light guide plate having circular end faces which surround light sources, the light guide plate being long in a direction in which the light sources are high in luminance and having a back which is inclined so as to be smaller in plate thickness gradually as the distance from the light sources becomes longer, and also provided with a reflection frame, the reflection frame having end-face reflective portions which cover the portions of the light guide plate near the light sources and also having inclined reflective portions which are contiguous to the end-face reflective portions and which are inclined approximately 45° in a longitudinal and thickness directions of the light guide plate at positions spaced apart from the light sources. By this construction, the intensity of radiation light is rendered uniform throughout the whole radiation surface.

15 Claims, 4 Drawing Sheets

SURFACE ILLUMINATOR

BACKGROUND OF THE INVENTION

1. Field of the Invention

The present invention relates to a surface illuminator for illuminating, for example, a liquid crystal display panel from the back of the panel.

2. Description of the Prior Art

FIG. 1 is a perspective view of a conventional surface illuminator which is disclosed, for example, in Japanese Utility Model Laid Open No. 69281/87. In the same figure, the reference numeral 1 denotes a light guide plate; numerals 2a and 2b denote incandescent lamps disposed at an end face of the light guide plate 1; and numeral 3 denotes a reflection frame which surrounds the light guide plate 1 and the incandescent lamps 2a, 2b.

The operation of such conventional surface illuminator will now be described. Light rays from the incandescent lamps 2a and 2b are conducted as in FIG. 2 by the light guide plate 1. At this time, the light rays are scattered and reflected by a scattering/reflection layer (not shown) formed on the back of the light guide plate 1, then are radiated from the surface of the light guide plate, whereby a liquid crystal display panel (not shown) or the like disposed on the front face of the light guide plate 1 can be illuminated.

The conventional surface illuminator is constructed as above, so for example, in the case where the incandescent lamp 2a is disposed so that a longitudinal direction of a filament 2c of the lamp 2a is parallel to an end face 1a of the light guide plate 1, as shown in FIG. 3, a luminance distribution of the incandescent lamp 2a is as indicated by dotted line A (the light intensity is uniform on the dotted line). That is, the portion of the end face 1a of the light guide plate 1 close to the incandescent lamp 2a is large in the amount of incident light, while the portion thereof far from the lamp 2a is small in the amount of incident light. After all, there is obtained such an incident light volume distribution as indicated by dotted line B, thus causing the problem of localization.

As shown in FIG. 2, moreover, light rays emitted from the incandescent lamps 2a, 2b and having an angle of incidence not smaller than a critical angle of the light guide plate 1 (about 45° in the case of an acrylic light guide plate) are reflected without entering the interior of the light guide plate, with the result that the light radiated from the surface of the light guide plate is strong at the portion close to the incandescent lamps 2a, 2b and weak at the portion far from the lamps, thus making it impossible to obtain a uniform surface illumination.

SUMMARY OF THE INVENTION

In view of the foregoing, it is an object of the present invention to provide a surface illuminator capable of making the intensity of radiation light uniform throughout the whole area of the radiation surface.

According to an aspect of the present invention, for achieving the above-mentioned object, there is provided a surface illuminator provided with a light guide plate, the light guide plate having circular end faces which surround light sources, being long in a direction in which the luminance of the light sources is high and having a back which is inclined so as to be smaller in plate thickness gradually as the distance from the light sources becomes longer, and also provided with a reflection frame, the reflection frame comprising end-face reflective portions which cover the portions of the light guide plate close to the light sources and inclined reflective portions which are contiguous to the end-face reflective portions and which are inclined approximately 45° in the longitudinal direction and thickness direction of the light guide plate at positions spaced apart from the light sources.

As stated above, according to the surface illuminator in the above aspect of the present invention, light rays from the light sources which have entered the interior of the light guide plate through the circular end faces are conducted away from the light sources by the inclined reflective portions located in positions spaced apart from the light sources so that the portion of the light guide plate close to the light sources and the portion thereof far from the light sources become uniform in luminance, thereby making the light rays radiated from the surface of the light guide plate uniform throughout the whole surface.

The above and further objects and novel features of the present invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

Preferred embodiments of the invention will now be described in detail referring to the accompanying drawings. The descriptions of the common component parts are omitted here to avoid unnecessary repetition.

Embodiment 1

Figure 1:
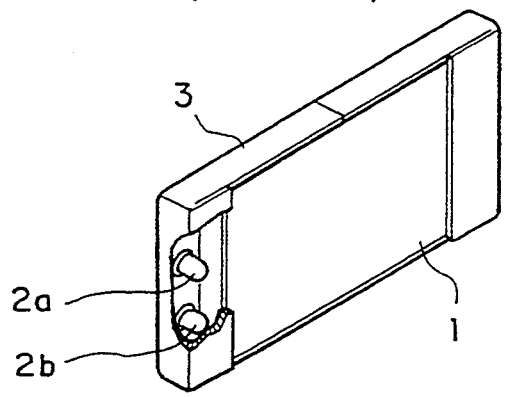
FIG. 1 is a perspective view of a conventional surface illuminator.
Figure 2:
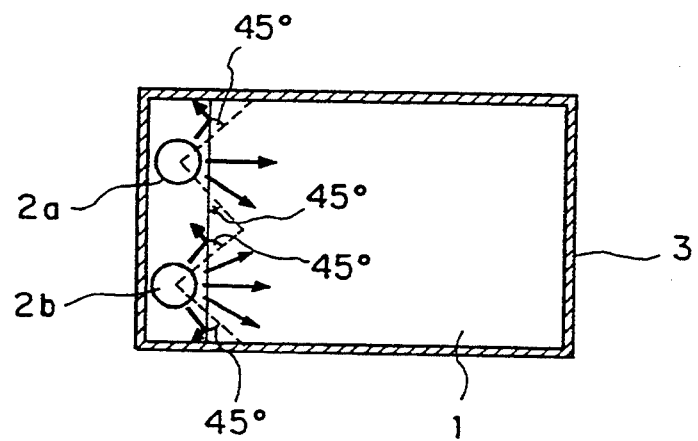
FIG. 2 is a view explanatory of an angle of incidence on a conventional light guide plate.
Figure 3:
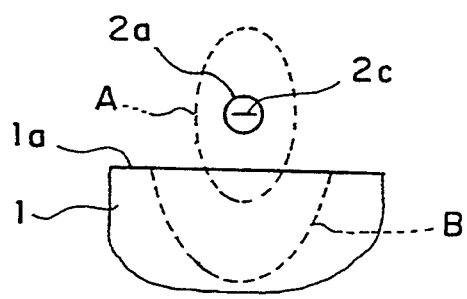
FIG. 3 is a partial enlarged plan view showing an intensity distribution of a conventional light source.
Figure 4:
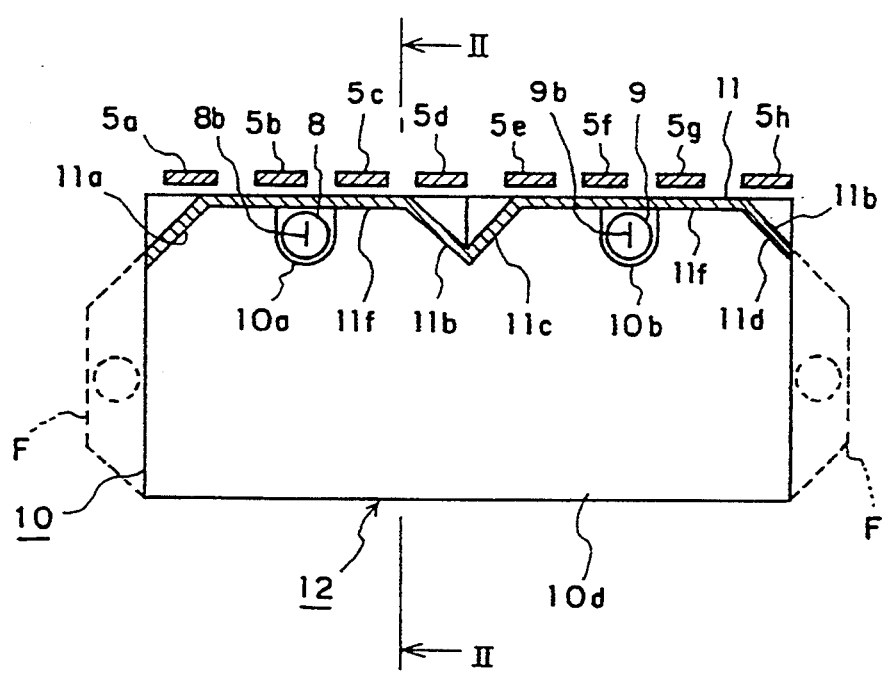
FIG. 4 is a sectional view of a surface illuminator according to an embodiment of the present invention.
Figure 5:
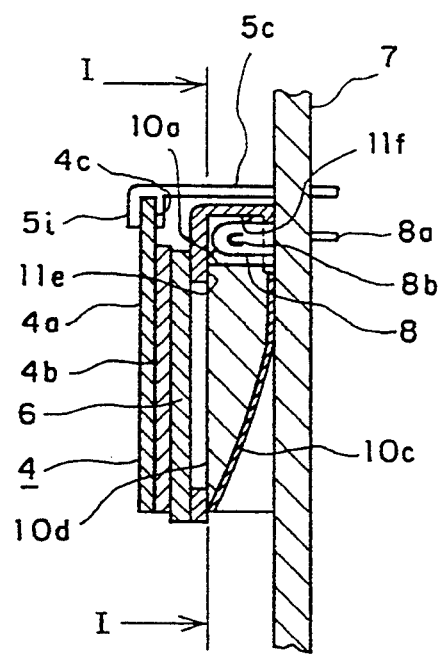
FIG. 5 is a sectional view taken on line II—II in FIG. 4.

An embodiment of the present invention will now be described with reference to the drawings. FIG. 4 is a sectional view of a surface illuminator embodying the invention, taken on line I—I in FIG. 5, and FIG. 5 is a sectional side view taken on line II—II in FIG. 4. In FIGS. 4 and 5, the numeral 4 denotes a liquid crystal display panel on which display patterns (not shown) are formed by transparent electrodes (not shown) and which illuminates and extinguishes a predetermined display pattern in accordance with a signal provided from a control circuit (not shown). The liquid crystal display panel 4 has a first glass plate 4a and a second glass plate 4b for gripping a liquid crystal material (not shown).

Numeral 4c denotes a terminal portion including terminals of the transparent electrodes arranged on the first glass plate 4a; and numerals 5a to 5h denote leads which are connected electrically to the transparent electrodes in the terminal portion 4c of the liquid crystal display panel 4. A grip part 5i of each lead, e.g. lead 5c, grips the terminal portion 4c of the first glass plate 4a.

Numeral 6 denotes a dimming/filter plate which is colored and capable of transmitting light, the dimming/filter plate being disposed behind the liquid crystal display panel 4, namely, on the second glass plate 4b side and having a scattering surface for scattering and uniforming light and also having a colored back for coloring light which back is colored by silk screen printing for example. Numeral 7 denotes a printed board to which are soldered the leads 5a to 5h of the liquid crystal display panel 4.

Further, numerals 8 and 9 each denote a light source constituted by an incandescent lamp with lead 8a soldered to the printed board 7, and numerals 8b and 9b denote filaments of the light sources 8 and 9, respectively. In FIG. 4, the light sources 8 and 9 are disposed in such a manner that they are long in the vertical direction.

Numeral 10 denotes a light guide plate capable of conducting light and made of an acrylic resin for example, the light guide plate 10 having generally circular end faces 10a and 10b for incidence of light thereon which end faces surround the light sources 8 and 9, respectively. The light guide plate 10 has a back which is inclined in the form of a curved surface to make the plate thickness smaller gradually as the distance from the light sources becomes longer. On the back of the light guide plate is formed a scattering/reflection layer 10c such as a white coating or the like.

In this construction, incident light rays from the circular end faces 10a and 10b travel through the interior of the light guide plate 10, then are reflected irregularly by the scattering/reflection layer 10c and radiated from a plate surface 10d.

Numeral 11 denotes a reflection frame constituted by an aluminum plate for example, which holds the light guide plate 10 grippingly. The reflection frame 11 has approximately 45° reflective portions 11a to 11d as inclined reflective portions and end-face reflective portions 11e, 11f in a surrounding relation to the light sources 8, 9 and the portions of the light guide plate 10 close to the light sources. These light sources 8, 9, light guide plate 10 and reflection frame 11 constitute a surface illuminator 12.

Figure 8:
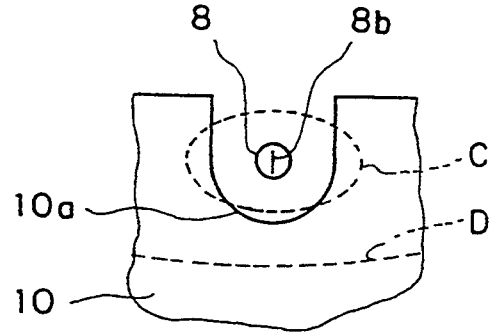
FIG. 8 is an enlarged plan view of a principal portion, showing an intensity distribution of a light source according to the present invention.

The operation will now be described. The light sources 8 and 9 are disposed so that the respective filaments 8b and 9b are orthogonal to a longitudinal direction (the transverse direction in FIG. 4) of the light guide plate 10. As shown in FIG. 8, a luminance distribution of the light source 8 is as indicated by dotted line C.

Therefore, at the circular end face 10a of the light guide plate 10, the luminance of the light source 8 is weak in the direction parallel to the filament 8b of the light source, while the luminance of the light source 8 is strong in the direction perpendicular to the filament 8b of the light source.

However, the circular end face 10a of the light guide plate 10 surrounds the light source 8 in the form of a semi-concentric circle, so at the portion lower than the center of the light source 8 (the downward direction in FIG. 6), the light from the light source is always incident in the normal line direction relative to the end face 10a of the light guide plate 10, while at the portion higher than the center of the light source 8 (the upward direction in FIG. 6), the light from the light source is always incident in a refracted state in accordance with a refractive index peculiar to the material of the light guide plate 10 relative to the end face 10a of the light guide plate 10.

Therefore, the light becomes incident without exceeding a critical angle of the circular end face 10a, and there is obtained a high incidence efficiency for almost all the angles of the light source 8. Consequently, as indicated by dotted lines D in FIG. 8, the difference in luminance between the portion close to the light source 8 and the portion far from the same light source becomes extremely small. But this difference in luminance appears in the portion of a region E wherein two dotted lines D intersect each other.

Figure 6:
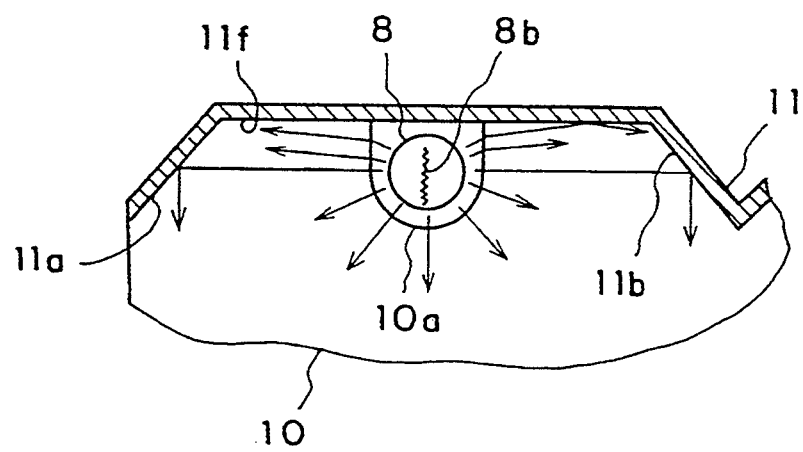
FIG. 6 is a sectional view showing on a larger scale, a principal portion, including a light source and the vicinity thereof, in FIG. 4.
Figure 7:
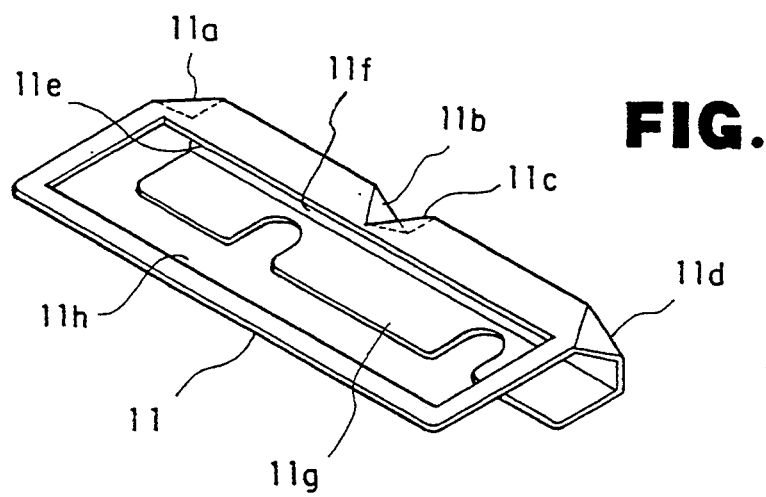
FIG. 7 is a perspective view showing an external shape of a reflection frame used in the surface illuminator illustrated in FIG. 4.
Figure 9:
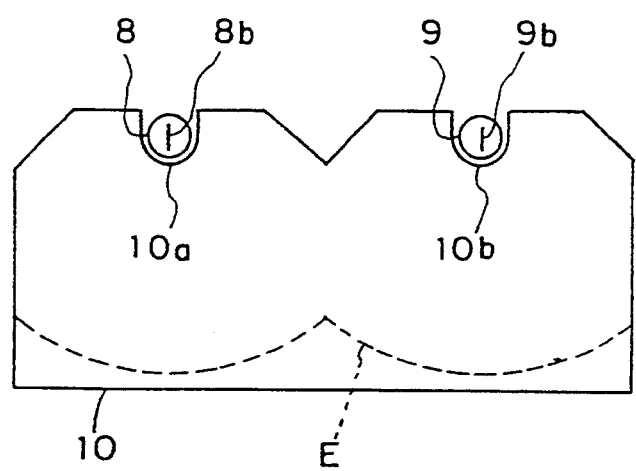
FIG. 9 is a plan view of a light guide plate, showing a light source intensity distribution according to the present invention.

However, as shown in FIGS. 6 and 7, since the approximately 45° reflective portions 11a and 11b of the reflection frame 11 for rejecting light incident on the light guide plate 10 from the light source 8 are constituted so as to be at an angle of about 45° relative to the longitudinal direction of the light guide plate 10 and also at about 45° relative to the thickness direction (the transverse direction in FIG. 5) of the light guide plate, it is possible to conduct reflected light to the portion E in FIG. 9 and hence possible to eliminate the foregoing difference in luminance.

Thus, at any portion in the longitudinal direction of the light guide plate 10, the quantity of light incident in the direction of the liquid crystal display panel 4 as the display surface side can be made almost equal, and the difference in luminance can be eliminated by the reflection frame 11. Consequently, the light incident from the circular end face 10a is propagated uniformly throughout the whole of the light guide plate 10, then is scattered and reflected by the scattering/reflection layer 10c and is radiated from the surface 10d of the light guide plate 10.

Accordingly, the luminance distribution at various points on the light guide plate surface 10d become uniform, so that the radiation light from the plate surface 10d illuminates the dimming/filter plate 6 uniformly. Next, the said radiation light is colored while passing through the plate 6 and is rendered more uniform in luminance distribution, then illuminates the liquid crystal display panel 4. Thus, the surface 10d of the light guide plate 10 becomes a uniform luminous surface, whereby the panel 4 can be illuminated uniformly.

In this embodiment, since the light sources 8 and 9 are disposed behind the terminal portion 4c of the liquid crystal display panel, it is not necessary to provide special places (positions F in FIG. 4) for the light sources 8, 9 and the approximately 45° reflective portions 11a to 11d, and hence it is possible to reduce the area occupied by the apparatus.

In this embodiment, moreover, since the first glass plate 4a connected to the leads 5a–5h is disposed outside, while the second glass plate 4b is disposed on the surface illuminator 12 side, the spacing between the end-face reflective portion 11e of the reflection frame 11 and the grip part 5i of each of the leads 5a-5h can be taken wide, so that when the reflection frame 11 has electrical conductivity, short-circuits of the leads 5a-5h caused by the reflection frame 11 become difficult to occur.

Further, according to the structure of this embodiment, despite the end-face reflective portion 11e of the reflection frame 11 is disposed in close contact between the dimming/filter plate 6 and the light guide plate 10, a space created by such an opening portion 11h of the reflection frame 11 as shown in FIG. 7 and corresponding to the plate thickness prevents the plate 6 from coming into contact with the light guide plate 10 due to thermal shrinkage thereof at heat load, and thus it is possible to prevent unevenness in luminance even at heat load.

Embodiment 2

Although in the above embodiment the surface illuminator according to the invention was applied to the illumination of a liquid crystal display panel, it goes without saying that the surface illuminator according to the invention is also employable for the display of a light transmitting display panel or for use as a mere lighting unit.

As set forth above, the surface illuminator according to the present invention is provided with a light guide plate, the light guide plate having circular end faces which surround light sources, being long in a direction in which the luminance of the light sources is high and having a back which is inclined so as to be smaller in plate thickness gradually as the distance from the light sources becomes longer, and is also provided with a reflection frame, the reflection frame comprising end-face reflective portions which cover the portions of the light guide plate close to the light sources and inclined reflective portions which are contiguous to the end-face reflective portions and which are inclined approximately 45° in the longitudinal direction and thickness direction of the light guide plate at positions spaced apart from the light sources. According to this construction, the light rays from the light sources which have entered the interior of the light guide plate through the circular end faces are fed sufficiently also to the portion spaced away from the light sources to make the luminance of that portion equal to that of the portion close to the light sources, thereby obtaining an effect that radiation light which is uniform in intensity can be emitted from the entire surface of the light guide plate.

What is claimed is:

1. A directional light guide, comprising:
   a reflector, symmetric about an axis;
   a light source emitting light rays, lying on the axis, the axis defining a first direction from the reflector to the light source;
   a solid transmission medium, including a surface, in conjunction with said reflector, surrounds said light source, said surface formed so as to bend light rays toward the first direction if the light rays are not travelling in the first direction plus or minus ninety degrees, when the light rays enter the transmission medium.

2. The light guide of claim 14, wherein said surface is formed so as not to bend light rays if the light rays are travelling in the first direction plus or minus ninety degrees.

3. A surface illuminator comprising:
   a plurality of light sources having strong and weak portions in luminance distribution;
   a light guide plate being long in a direction in which said light sources are high in luminance and having a back which is inclined so as to be smaller in plate thickness gradually as the distance from the light sources becomes longer; and
   a reflection frame having end-face reflective portions which cover the portions of said light guide plate close to said light sources and also having inclined reflection portions which are contiguous to said end-face reflective portions and which are inclined approximately 45° in longitudinal and thickness directions of the light guide plate an positions spaced apart from said light sources;
   said light guide plate including,
      an end face surface, which, in conjunction with the reflection frame, encircles each light source of said plurality of light sources; and
      the end face surface adjacent to each of said plurality of light sources being formed in the shape of a partial cylinder for a part of the end face surface below the center of a light source and being formed in the shape of two planes tangentially extending from the partial cylinder to the reflection frame for a part of the end face surface above the center of the light source so as to tend to bend light away from the reflection frame when light enters the light guide plate.

4. The surface illuminator of claim 3, wherein each end face surface adjacent to each of said plurality of said light sources is formed in the shape of a partial with the center of the light source lying on the axis of the cylinder.

5. The surface illuminator of claim 3, wherein
   each end face surface adjacent to each of said plurality of light sources is formed in the shape of two parallel planes tangentially extending from the partial cylinder to the reflection frame.

6. An illuminator comprising:
   at least one light source;
   a reflection surface, disposed above said at least one light source;
   a solid light transmission medium, having an end face, and for each light source of the at least one light source, the end face having a portion which, in conjunction with said reflection surface, surround each of the at least one light source; wherein
   each portion having a cross-section of a partial circle for a part of the portion below a center of the light source and straight lines tangentially connecting ends of the partial circle to the reflection surface for a part of the portion above the center of the light source.

7. The illuminator of claim 6, wherein
   each portion, has a cross-section of a partial circle having the center of the light source as a center.

8. The illuminator of claim 6, wherein
   each portion has a cross-section of parallel lines tangentially connecting the ends of the partial circle to the reflection surface.

9. The illuminator of claim 8, wherein
   each portion, has a cross-section of a partial circle having the center of the light source as a center.

10. The illuminator of claim 9, wherein said solid light transmission medium has a width which diminishes as a function of the distance from the reflection surface.

11. The illuminator of claim 10, wherein said reflection surface includes multiple planar reflection surfaces joined at an angle.

12. The illuminator of claim 11, wherein said multiple planar reflection surfaces are joined at approximately forty-five degrees.

13. The illuminator of claim 12, wherein each of said at least one light source includes a filament which substantially lies in a vertical plane.

14. A directional light guide, comprising
a light source emitting light rays in many directions;
a reflector disposed behind the light source, a majority of said reflector lying in a plane;
a solid light transmission medium including an end face, which, in conjunction with said reflector, surrounds said light source, said end face formed so as to refract a light ray having a direction towards the plane away from the plane, with respect to the original direction of the light ray, upon the light ray entering said transmission medium.

15. The directional light guide of claim 14, wherein said end face is formed so as to not bend a light ray having a direction away from the plane, upon the light ray entering said transmission medium.

* * * * *